United States Patent
Bruekers et al.

[11] Patent Number: 6,157,330
[45] Date of Patent: Dec. 5, 2000

[54] EMBEDDING SUPPLEMENTAL DATA IN AN ENCODED SIGNAL, SUCH AS AUDIO / VIDEO WATERMARKS

[75] Inventors: Alphons A. M. L. Bruekers; Geert F. G. Depovere; Petrus A. C. M. Nuijten; Arnoldus W. J. Oomen, all of Eindhoven, Netherlands

[73] Assignee: U.S. Philips Corporation, New York, N.Y.

[21] Appl. No.: 09/013,540

[22] Filed: Jan. 26, 1998

[30] Foreign Application Priority Data

Jan. 27, 1997 [EP] European Pat. Off. .............. 97200197

[51] Int. Cl.[7] ............................. H03M 3/00; H04N 7/167
[52] U.S. Cl. ............................................. 341/143; 380/203
[58] Field of Search .................................. 380/54, 51, 59, 380/4, 5, 203; 341/143; 382/238, 100; 700/39; 283/113; 326/8; 399/366

[56] References Cited

U.S. PATENT DOCUMENTS

| | | | |
|---|---|---|---|
| 5,428,683 | 6/1995 | Indeck et al. | 380/4 |
| 5,568,570 | 10/1996 | Rabbani | 382/238 |
| 5,757,910 | 5/1998 | Rim | 380/203 |
| 5,809,139 | 9/1998 | Girod et al. | 380/5 |
| 5,889,868 | 3/1999 | Moskowitz et al. | 380/51 |

FOREIGN PATENT DOCUMENTS 2285561 7/1995 United Kingdom .

OTHER PUBLICATIONS

Bors et al, "Image Watermarking Using DCT Domain Constriants," Image Processing, 231–234, Sep. 1996.

Swanson et al, "Transparent Robust Image Watermarking," Image Processing, 211–214, Sep. 1996.

Wolfgang et al, "A Watermark for Digital Images," Image Processing, 219–222, Sep. 1996.

Magrath et al, "Encoding Hidden Data Channels in Sigma Delta Bitstreams," IEEE, 1998.

F. Hartung and B. Giros: "Digital Watermarking of Raw and Compressed Video", SPIE vol. 2952, pp. 205–212.

I.J. Cox, J. Kilian, T. Leighton and T. Shamoon: "A Secure Imperceptible Yet Perceptually Salient, Spread Spectrum Watermark for Multimedia", A Conference Record of Southcon 96, Jun. 25–27, 1996, pp. 192–197.

*Primary Examiner*—Patrick Wamsley
*Attorney, Agent, or Firm*—Michael E. Belk

[57] ABSTRACT

Method of embedding watermarks in a signal encoded by an encoder having a feedback loop, for example, a sigma-delta modulator (21,22,23). A digital watermark pattern (w) is embedded in the signal (z) by modifying selected samples (for example, replacing every 100th bit) of the encoded signal (y) by samples of the watermark pattern. The circuit (24) for modifying the samples is located inside the loop of the encoder. The effect of watermarking is thus compensated in subsequent encoding steps and the signal-to-noise ratio is only slightly affected.

25 Claims, 5 Drawing Sheets

EMBEDDING SUPPLEMENTAL DATA IN AN ENCODED SIGNAL, SUCH AS AUDIO / VIDEO WATERMARKS

FIELD OF THE INVENTION

The invention relates to a method and arrangement for embedding supplemental data in an encoded signal. The method comprises the steps of encoding the signal in accordance with a given encoding process including the step) of feeding back the encoded signal to control said encoding, and modifying the encoded signal to represent said supplemental data. The invention also relates to a method and arrangement for extracting the supplemental data from such an encoded signal.

BACKGROUND OF THE INVENTION

There is a growing need to accommodate watermarks in audio and video signals. Watermarks are supplemental data messages embedded in multimedia assets, preferably in a perceptually invisible manner. They comprise information, for example, about the source or copyright status of documents and audiovisual programs. They can be used to provide legal proof of the copyright owner, and allow tracing of piracy and support the protection of intellectual property.

A known method of watermarking a video signal as defined in the opening paragraph is disclosed in F.Hartung and B.Giros: "Digital Watermarking of Raw and Compressed Video", SPIE Vol. 2952, pp. 205–212. Watermarking is herein achieved by modifying selected DCT coefficients in the output bitstream of an MPEG2 encoder, including DCT coefficients of predictively encoded (P or B) pictures. Predictive encoders include a feedback loop to control the encoding process. A prediction error (the difference between the input signal and a prediction therefor) is encoded rather than the input signal itself. The prediction signal is obtained by locally decoding the encoded signal.

In the prior art method, the watermarks are inserted after conventional coding. The capacity available for watermarking the encoded signal in this manner appears to be restricted.

OBJECT AND SUMMARY OF THE INVENTION

It is an object of the invention to provide a method of embedding supplemental data in an encoded audio or video signal, which allows more bits of the encoded signal to be altered without substantially affecting the perceptual quality.

To this end, the method according to the invention is characterized in that the step of feeding back the encoded signal is carried out after said step of modifying said signal. The step of modifying the encoded signal is now performed inside the feedback loop of the encoder. Any modification of the encoded signal for the purpose of watermarking is thus fed back and will be compensated in a subsequent coding operation. The watermark thus embedded influences the decoding process in a receiver in a similar manner as it influenced the encoding process in the transmitter. As a result of the compensation process in the transmitter, receivers reproduce a significantly better replica of the input signal. The signal-to-noise ratio is considerably improved or, alternatively, more watermark data can be embedded at a given signal-to-noise ratio.

The invention is particularly useful for embedding supplemental data in unity bit encoded signals. Unity bit encoded signals are very vulnerable to watermarking. The encoders produce a one-bit output sample for each encoding step. Modifying an output sample of the encoded signal for the purpose of watermarking is generally more drastic than, for example, merely changing the value of a multi-bit sample.

Examples of unity bit encoders are delta modulators, sigma-delta modulators, and noise shape encoders. They also belong to the family of encoders having a feedback loop. Sigma-delta modulation is envisaged for recording high-quality audio on the audio version of the Digital Versatile Disc (DVD), using a sampling frequency of 2822400 Hz (64*44100) and having a signal-to-noise ratio of 115 dB. Watermarks are inserted, for example, by replacing selected bits of the output bitstream by bits of a digital watermark pattern. If this is done in the way as taught by the prior art, i.e. after conventional coding, the insertion of watermark bits raises the quantization noise considerably. For example, replacing 1 bit of every 100 bits of the sigma-delta modulated audio signal by a watermark bit will raise the quantization noise to −60 dB. In contrast, the invention allows 1 bit per 100 bits of the sigma-delta modulated audio signal to be changed at the expense of only a 1 dB increase of the quantization noise. This corresponds to a watermark bit rate of about 28000 bits per second.

DESCRIPTION OF EMBODIMENTS

Figure 1:
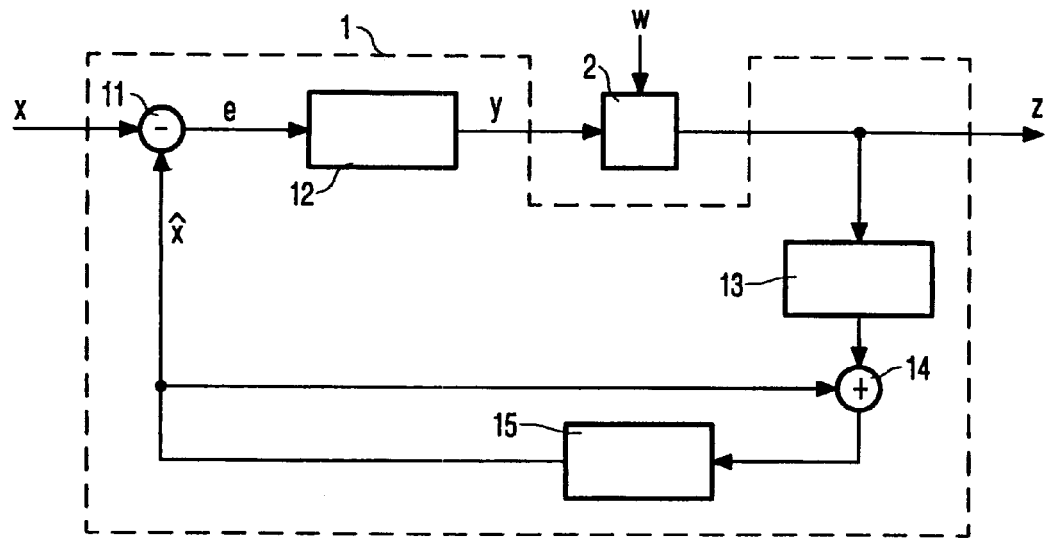
FIG. 1 shows an arrangement for embedding supplemental data in an encoded audio or video signal in accordance with the invention.

FIG. 1 is a diagram of an arrangement for embedding supplemental data in an encoded audio or video signal in accordance with the invention. The arrangement comprises a predictive encoder 1 and a modification circuit 2. The predictive encoder 1 receives an (analog or digital) input signal x and comprises a subtracter 11 for subtracting a prediction signal $\hat{x}$ from the input signal x. A prediction error signal e thus obtained is applied to an encoding stage 12. The predictive encoder further comprises a feedback path for obtaining the prediction signal $\hat{x}$, including a decoding stage 13, an adder 14 and a delay 15. The predictive encoder 1 may take various forms which are known per se in the art, such as a deltamodulator, a differential pulse code modulator, or a discrete cosine transform (DCT) encoder.

Modification circuit 2 receives the encoded prediction error signal y and is arranged to modify this signal in accordance with a given watermarks w. Examples of this modification circuit are known in the art. In the Hartung et al. reference, already discussed hereinbefore, 8*8 blocks of the watermark signal w are subjected to a DCT and the DCT coefficients thus obtained are added to selected DCT coefficients of the transform-coded prediction error signal. Another example is disclosed in I. J. Cox, J. Kilian, T. Leighton and T. Shamoon: "A Secure Imperceptible yet Perceptually Salient, Spread Spectrum Watermark for Multimedia", a Conference Record of Southcon 96, Jun. 25–27, 1996, pp. 192–197. In this reference, a video signal is watermarked by adding a sequence of real numbers to the highest order transform coefficients, excluding the DC coefficient.

In accordance with the invention, the modification circuit 2 is located between encoding stage 12 and decoding stage 13, i.e. inside the loop) of the predictive encoder. The prediction signal x̂ is thus derived from the modified encoded signal z instead of the unmodified encoded signal y. Its effect becomes apparent when the step of watermarking a signal is considered to be equivalent to deliberately introducing errors in the encoded signal y. In the prior-art system, the "errors" are inserted in the transmitted signal. As is known in the field of predictive coding, such errors propagate throughout the decoding process in a receiver and cause a serious degradation of signal quality. Here, however, the errors are introduced inside the prediction loop. Any "error" introduced by modification stage 2 is now fed back via decoding stage 13 to subtracter 11, resulting in the prediction error being subsequently encoded in such a way that its effect is compensated. Consequently, the allowed "error rate" for a given signal-to-noise ratio is considerably increased, and/or the perceptual quality is significantly improved.

Receivers for decoding the encoded signal from encoders as shown in FIG. 1 are generally identical to the prediction loop of the encoders and are therefore not separately shown.

A more detailed example will now be given with reference to FIG. 2 which shows a delta modulator for encoding an analog or PCM coded audio signal. The arrangement comprises a subtracter 21 for subtracting the prediction signal x̂ from the input signal x. The prediction error e is applied to a polarity detector 22 which produces, at a rate determined by a sampling frequency $f_s$, an output sample +1 for x>x̂ and an output sample −1 for x<x̂. The feedback loop includes a decoding filter 23 (a summer or integrator) to obtain the prediction signal. In accordance with the invention, a modification circuit 24 is connected between polarity detector 22 and filter 23. In this embodiment, the modification circuit is a multiplexer which replaces selected bits of the polarity detector output (for example, every 100th bit) by a watermark bit pattern w in response to a selection signal s. Another example of embedding the watermark is to invert selected samples of the encoded signal, the watermark data being represented by the number of bit periods between successive inverted samples.

Figure 2:
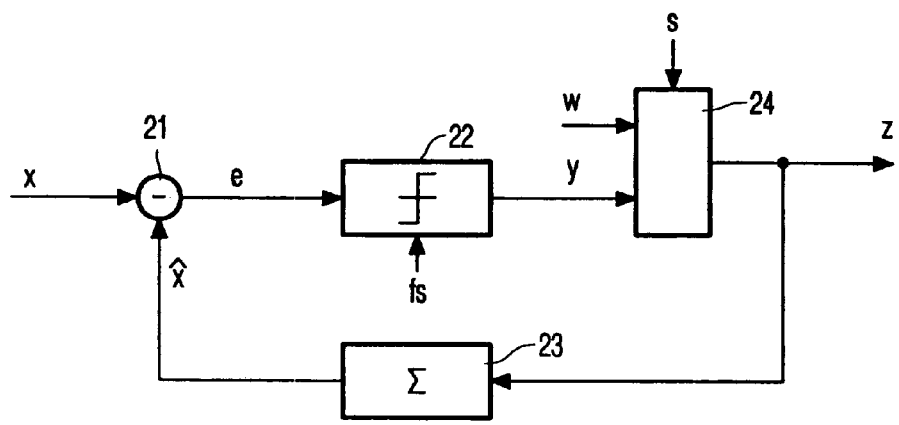
FIG. 2 shows an arrangement for embedding supplemental data in a delta modulated audio signal in accordance with the invention.
Figure 3:
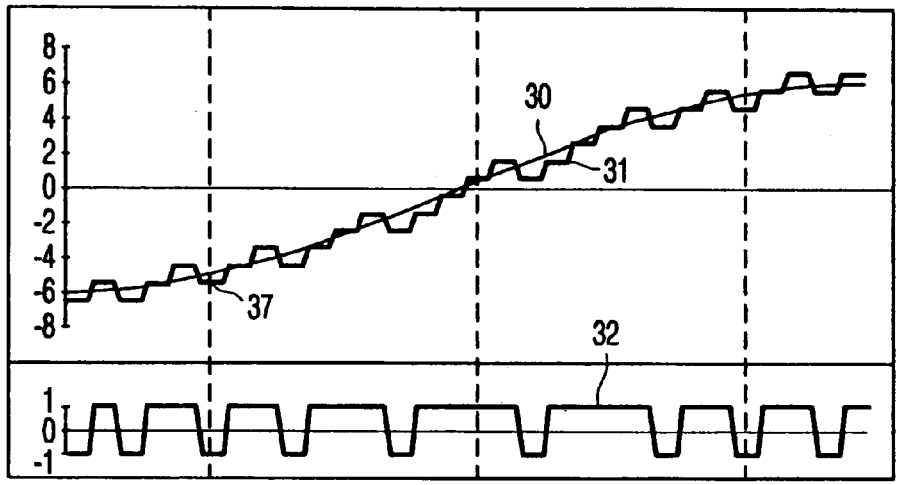
FIGS. 3–5 show signal waveforms to illustrate the operation of the arrangement shown in FIG. 2.
Figure 4:
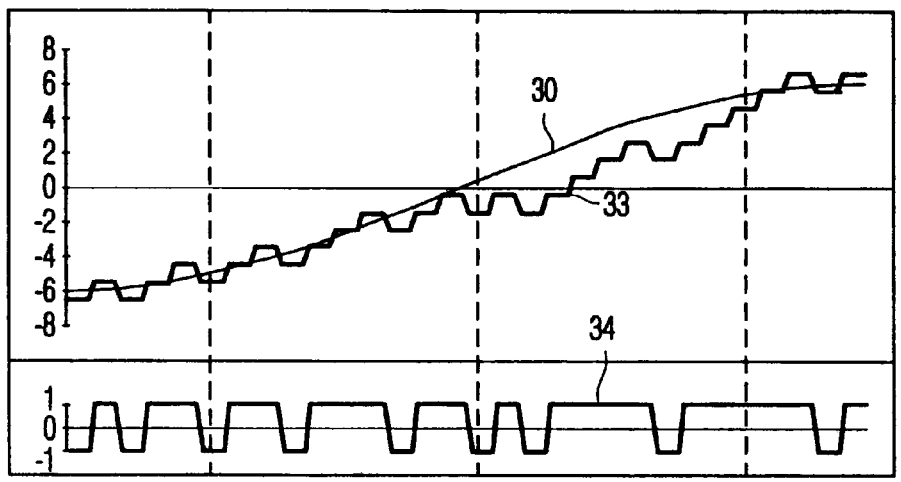
Figure 5:
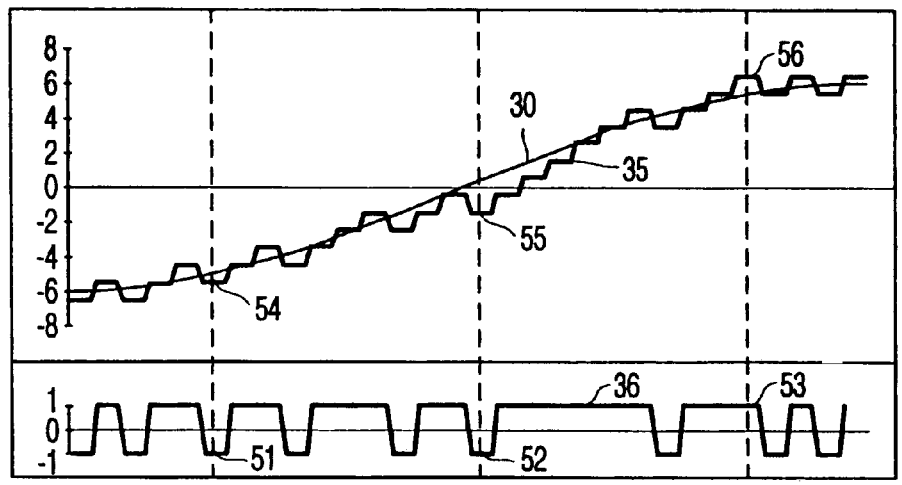

FIGS. 3–5 show various signal waveforms to illustrate the operation of the arrangement shown in FIG. 2. In the Figures, numeral 30 denotes the input signal x.

For reference, FIG. 3 shows the waveforms of a conventional delta modulator without watermarking facilities. In this Figure, numeral 31 denotes the prediction signal x̂ or, equivalently, the output signal of a receiver (apart from a low-pass filter operation to remove the excessive high frequency components). Numeral 32 denotes the output bitstream of the conventional delta modulator.

FIG. 4 elucidates the effect of watermarking the encoded signal in a manner taught by the prior art. Numeral 34 denotes the bitstream which is obtained by replacing the 6th, 16th and 26th bit of bitstream 32 (FIG. 3) by −1, −1 and +1, respectively, corresponding to a digital watermark pattern w='001'. Numeral 33 denotes the output signal of a receiver receiving this bitstream. A significant decrease of the signal-to-noise ratio can clearly be observed.

FIG. 5 shows the effect of embedding a watermark in accordance with the invention. Numeral 35 denotes the prediction signal x̂. Numeral 36 denotes the output bitstream of the arrangement. Similarly as in FIG. 4, the watermark bit pattern w='001' is accommodated at the 6th, 16th and 26th bit position of the bitstream 36, but now the bit modification is carried out before feeding back the encoded signal. The first bit 51 of the embedded watermark does not differ from the sample −1 which the polarity detector produces for that sample period. Accordingly, prediction signal level 54 is the same as prediction signal level 37 in FIG. 3. The second bit 52 of the watermark differs from the value +1 which the polarity encoder produces. As this 'erroneous' bit is now fed back through the prediction loop, the prediction signal assumes a level 55 which the delta modulator compensates by producing different subsequent bits. As a result, the prediction signal 35 already intersects the input signal again after a few sample periods. Similarly, the third watermark bit 53 causes the arrangement to produce a +1 sample, whereas the arrangement would otherwise have produced (and the polarity detector would then indeed produce) a value −1 for that sample period. Again, it takes only a few sample periods to compensate the "erroneous" prediction level 56.

The numeral 35 in FIG. 5 also denotes the output signal of a receiver. A comparison of waveforms 33 and 35 shows that the signal-to-noise ratio is significantly improved.

Figure 6:
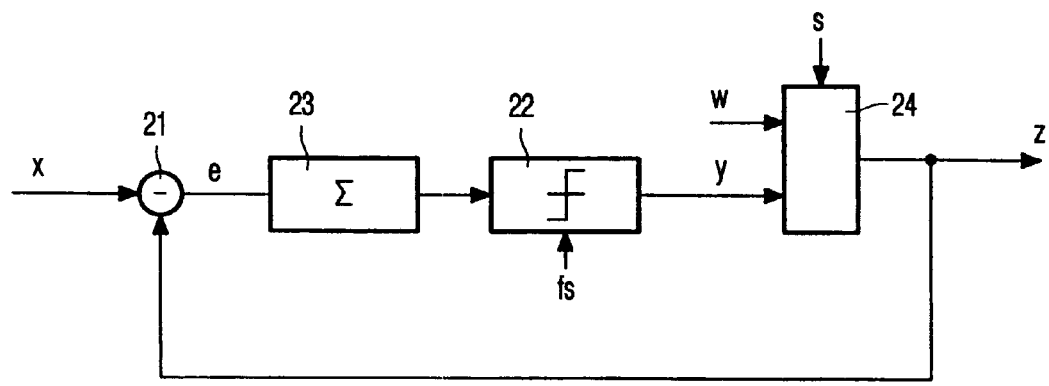
FIG. 6 shows an arrangement for embedding supplemental data in a sigma-delta modulated audio signal in accordance with the invention.

FIG. 6 shows a sigma-delta modulator in accordance with the invention. Sigma-delta modulation is envisaged for recording high-quality audio on the audio version of the Digital Versatile Disc. It differs from delta modulation in that the input signal x is filtered, prior to encoding, by the same filter as the filter in the prediction loop of a delta modulator. The filters in the input path and feedback path are then replaced by a single filter in the forward-path of the encoding loop. Accordingly, the sigma-delta modulator shown in FIG. 6 differs from the delta modulator shown in FIG. 2 in that filter 23 has been moved from the feedback path to the forward path.

Figure 7:
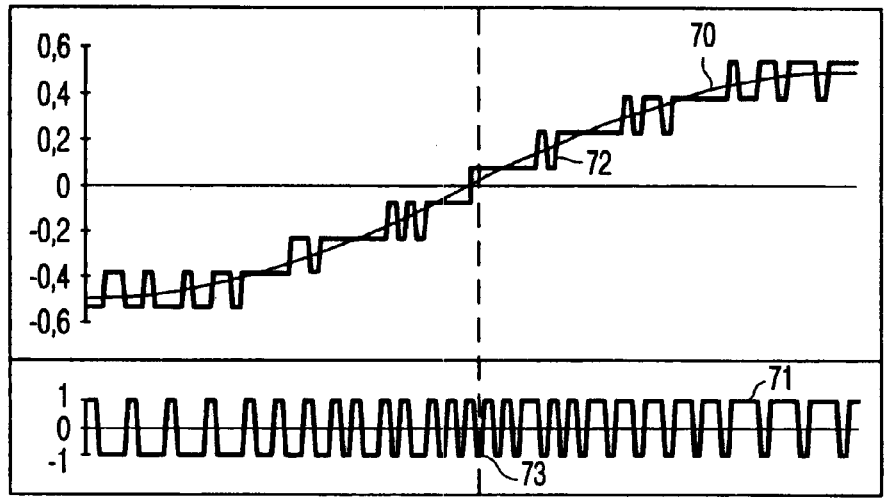
FIGS. 7–9 show waveforms to illustrate the operation of the arrangement shown in FIG. 6.

FIG. 7 shows waveforms of a conventional sigma-delta modulator without watermarking facilities. Numeral 70 denotes the input signal x, and numeral 71 denotes the encoded output signal. The sigma-delta modulator produces more positive samples as the input signal becomes larger. As FIG. 7 shows, the input voltage of −0.5V is encoded as a sequence of three −1V pulses and one +1V pulse, the input voltage of 0V is encoded as an alternating pattern of −1V and +1V pulses, and the input voltage of +0.5V is encoded as a sequence of three +1V pulses and one −1V pulse. The signal is decoded at the receiving end by reshaping the received pulses and passing them through a low-pass filter. In FIG. 7, the signal is demodulated by averaging 13 samples of the bitstream. Numeral 72 denotes the reconstructed signal, apart from the time delay caused by the averaging operation. The reconstructed signal is thus time-aligned with the input signal.

Figure 8:
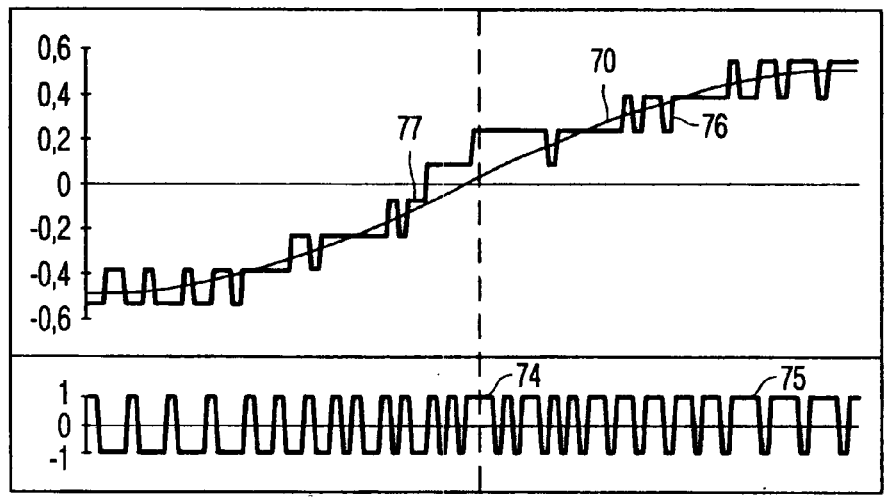

FIG. 8 shows the effect of watermarking the encoded signal in accordance with the prior art, i.e. after conventional sigma-delta modulation. In the example, a −1 sample 73

(FIG. 7) of the conventional sigma-delta modulator has been replaced by a +1 sample 74. This replacement does not affect the encoding process, and leaves the rest of encoded output signal 75 unmodified. Numeral 76 denotes the reconstructed signal at the receiving end. The difference with reconstructed signal 72 in FIG. 7 becomes manifest at 77 (which in the Figure is earlier in time due to time-aligning the signals) and ripples through the rest of the decoding process. Again, a significant decrease of the signal-to-noise ratio can be observed.

Figure 9:
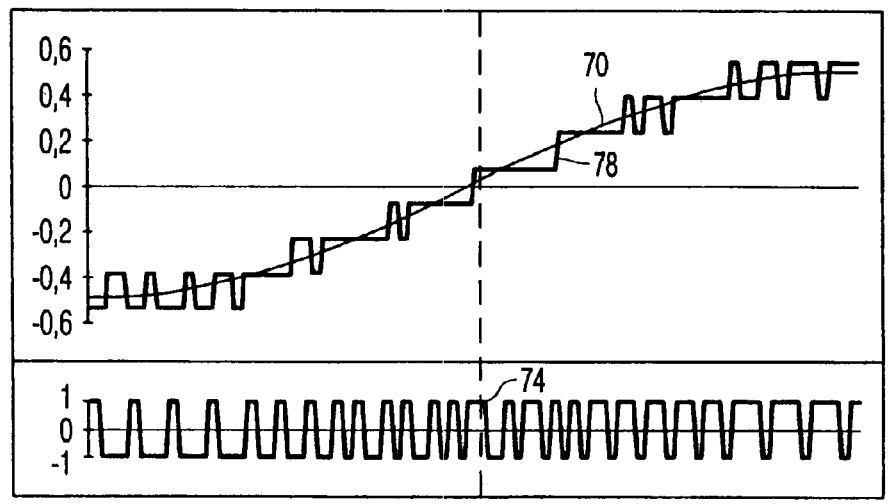

FIG. 9 shows the effect of embedding the same watermark sample 74 in accordance with the invention. Now, the effect of this watermark is fed back to the input and compensated by differently encoding the input signal after the watermark insertion. The reconstructed signal 78 now resembles the input signal significantly better.

A practical example of the sigma-delta modulator shown in FIG. 6 for encoding high-quality audio signals at a sampling frequency $f_s$ of 2822400 (64*44100) Hz has a signal-to-noise ratio of 115 dB. It has been found that replacing 1 sample per 100 samples increases the quantization noise by only 1 dB. This corresponds to a watermark bit rate of 28000 bits/sec.

Figure 10:
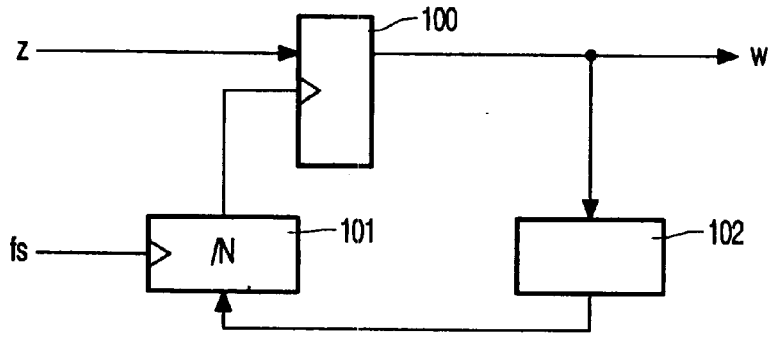
FIG. 10 shows an arrangement for extracting an embedded watermark from a signal encoded by an arrangement as shown in FIG. 2 or FIG. 6.

FIG. 10 shows an arrangement for extracting an embedded watermark from a delta-modulated signal generated by an arrangement as shown in FIG. 2 or a sigma-delta modulated signal generated by an arrangement as shown in FIG. 6. The modified encoded signal z is applied to the data input of a register 100 clocked by the selection signal s. The output of register 100 is the watermark bit pattern w. The selection signal s determines which bits of the bitstream are watermark bits. This selection signal is generated by a divider stage 101 which divides the sample frequency $f_s$ by a given number N, for example, 100. The signal is assumed to be synchronized with the corresponding selection signal s in the transmitter. Synchronization can be achieved by accommodating a predetermined synchronization bit pattern in the watermark signal w. In such an embodiment, a sync detector 102 detects said pattern and changes the phase of divider stage 101 until the sync pattern is detected.

Figure 11:
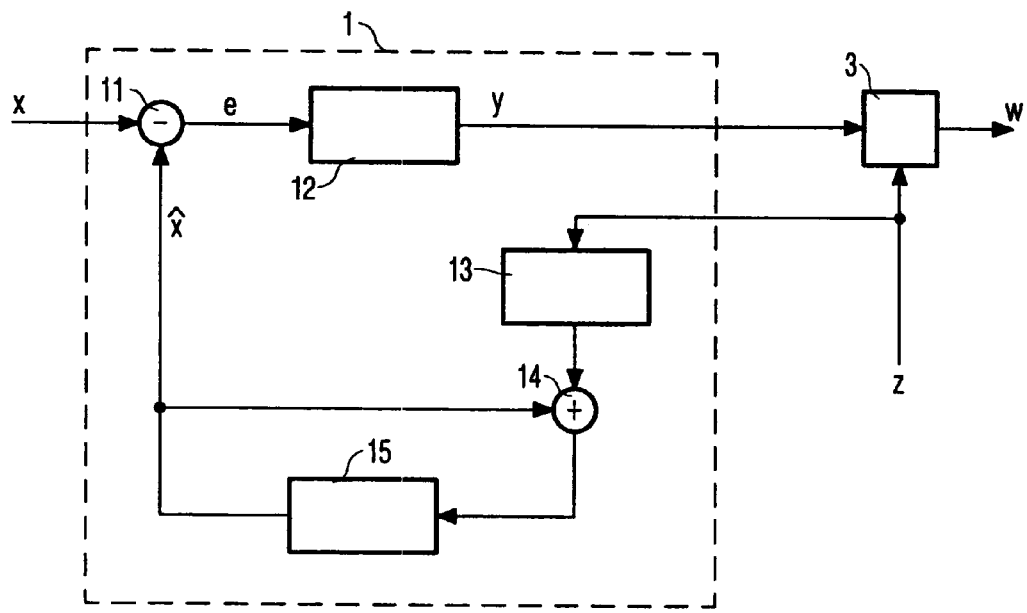
FIG. 11 shows an arrangement for extracting an embedded watermark from a signal encoded by an arrangement as shown in FIG. 1.

FIG. 11 shows an arrangement for extracting an embedded watermark which can be used if the original input signal x is available at the receiver end. The arrangement comprises the same encoder 1 as the corresponding transmitter shown in FIG. 1. However, the feedback loop now receives the watermarked signal z. Accordingly, the reconstructed prediction signal $\hat{x}$ is the same as is generated at the transmitter end. The locally encoded signal y and the received signal z are applied to an extraction circuit 3 which performs the inverse operations of modification circuit 2 in FIG. 1. For example, if the watermark signal is a sequence of real numbers which has been added to the DCT coefficients of an MPEG encoder, the extraction circuit is a subtracter.

Figure 12:
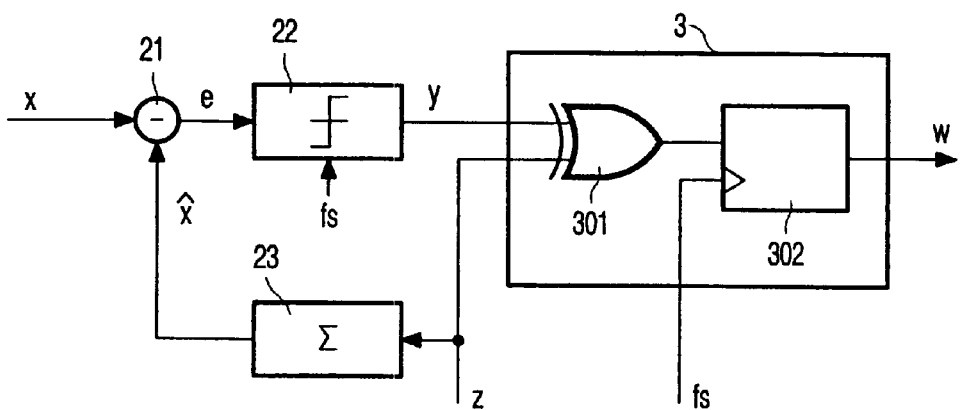
FIG. 12 shows a further embodiment for extracting the watermark from a (sigma-)delta modulated signal.

FIG. 12 shows a specific embodiment for extracting the watermark from a (sigma-)delta modulated signal. In the Figure, reference numerals 21–23 constitute the same delta modulator as shown in FIG. 2. The extraction circuit 3 comprises an exclusive OR-gate 301 which detects whether the bits of the watermarked signal z and the corresponding bits of the encoded signal y are equal. If they are not equal, a bit period has been detected in which the watermarked signal z carries an inverted bit. The detected signal is applied to a counter 302 which is clocked at the sample frequency $f_s$ and produces a binary '0' if the number of bit periods between two successive inverted bits is a first given number (for example, 75) and a binary '1' if said number of bit periods is a second given number (for example, 125).

Figure 13:
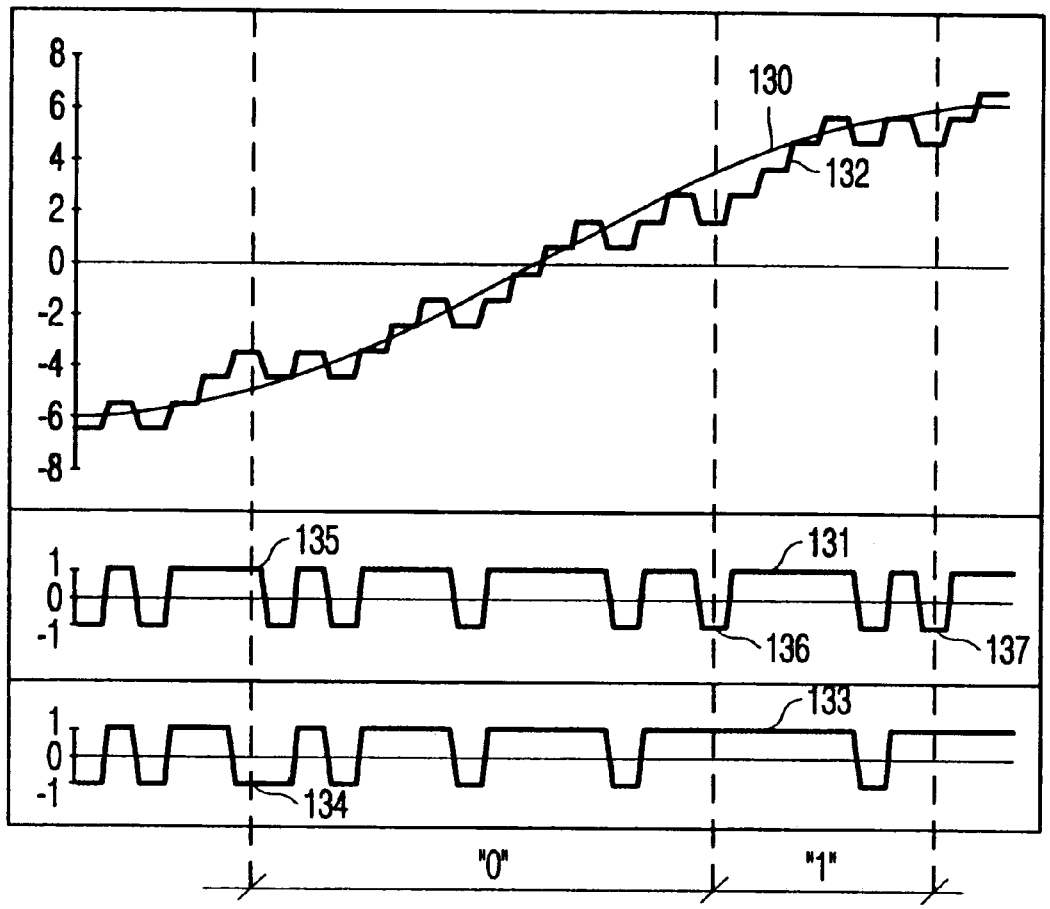
FIG. 13 shows signal waveforms to illustrate the operation of the embodiment shown in FIG. 12.

FIG. 13 shows signal waveforms to illustrate the operation of this embodiment. Reference numeral 130 denotes the original input signal x, numeral 131 denotes the received watermarked signal z, and numeral 132 denotes the prediction signal $\hat{x}$ which is obtained by decoding the watermarked signal. Numeral 133 denotes the output signal of local polarity detector 22 (FIG. 12). As can easily be seen in the Figure, the local polarity detector produces an output -1' (denoted 134) where the received signal z comprises a +1 (denoted 135). This discrepancy is detected by the exclusive OR-gate 301 (FIG. 12). In a similar manner, the exclusive OR-gate detects the occurrences of watermark bits denoted 136 and 137. The counter 302 (FIG. 12) counts the number of bit periods between the detected watermark bits. In the present (simplified) example, a distance of 15 bit periods represents a '0' and a distance of 7 bit periods represents a '1' of the watermark pattern.

In summary, a method of embedding watermarks in a signal encoded by an encoder having a feedback loop, for example, a sigma-delta modulator (21,22,23) is described. A digital watermark pattern (w) is embedded in the signal (z) by modifying selected samples (for example, replacing every 100th bit) of the encoded signal (y) by samples of the watermark pattern. The circuit (24) for modifying the samples is located inside the loop of the encoder. The effect of watermarking is thus compensated in subsequent encoding steps and the signal-to-noise ratio is only slightly affected.

What is claimed is:

1. A method of embedding supplemental data in an encoded signal, comprising the steps of:
    combining an input signal with a modified signal to produce a combined signal;
    encoding the combined signal in accordance with a given encoding process to produce an encoded signal; and
    modifying the encoded signal to represent the supplemental data to produce the modified signal.

2. The method of claim 1, wherein the encoding includes unity bit encoding.

3. The method of claim 2, wherein the encoding includes sigma-delta modulation.

4. The method of claim 1, wherein the step of modifying the encoded signal includes the replacement of selected samples of the encoded signal by samples of the supplemental data.

5. The method of claim 2, wherein the step of modifying the encoded signal includes the inversion of selected samples of the unity bit encoded signal, the embedded data being represented by the number of sample periods between successive inverted samples.

6. A method of extracting supplemental data from a received encoded signal in which selected predetermined samples are replaced by samples of the supplemental data, and including the step of selecting the samples in response to a predetermined selection signal.

7. The method of claim 6, wherein the selection signal is retrieved by detecting a synchronization pattern included in the supplemental data.

8. A method of extracting supplemental data from a received encoded signal, comprising the steps of:
    encoding the original signal in accordance with a given encoding process including the step of feeding back the received encoded signal to control the encoding; and
    comparing the encoded original signal and the received encoded signal, the difference between the signals representing the supplemental data.

9. The method of claim 8, wherein the supplemental data is represented by the number of sample periods between successive inverted samples, and further comprising the step of counting the number of sample periods between inverted samples to extract the supplemental data.

10. An arrangement for embedding supplemental data in an encoded signal, comprising:

means for combining an input signal with a modified signal to produce a combined signal;

an encoder for encoding the combined signal to produce an encoded signal;

means for modifying selected samples of the encoded signal to represent the supplemental data to produce the modified signal; and a feedback loop connected to feed the modified encoded signal back to the combining means.

11. The arrangement of claim 10, wherein the encoder includes a unity bit encoder.

12. The arrangement of claim 11, wherein the encoder includes a sigma-delta modulator.

13. The arrangement of claim 10, wherein the means for modifying the encoded signal includes a multiplexer for replacing selected samples of the encoded signal by samples of the supplemental data.

14. The method of claim 11, wherein the means for modifying the encoded signal include an inverter for inverting selected samples of the unity bit encoded signal, the embedded data being represented by the number of sample periods between successive inverted samples.

15. An arrangement for extracting supplemental data from a received encoded signal in which selected predetermined samples are replaced by samples of the supplemental data, comprising: register means for selecting the samples in response to a predetermined selection signal.

16. The arrangement of claim 15, further comprising means for detecting a synchronization pattern included in the supplemental data and means for generating the selection signal in response to the detection.

17. An arrangement for extracting supplemental data from a received encoded signal, comprising:

encoder means for encoding the original signal without the supplemental data and using the received encoded signal containing the supplemental data to control the encoding; and means for comparing the encoded original signal with the received encoded signal, the difference between the signals representing the supplemental data.

18. The arrangement of claim 17, wherein the supplemental data is represented by the number of sample periods between successive inverted samples, and further comprising a counter for counting the number of sample periods between inverted samples to extract the supplemental data.

19. An encoded signal produced by the process of claim 1.

20. An encoded signal with embedded supplemental data, in which selected bits of the encoded signal have been inverted to represent the supplemental data with the number of bit periods between successive inverted bits representing the embedded data.

21. A storage medium having stored thereon a signal produced by the process of claim 1.

22. A method of embedding supplemental data in an signal, comprising the steps of:

encoding the signal in accordance with a given encoding process including feeding back the encoded signal to control the encoding; and modifying the signal to represent the supplemental data after encoding the signal and before feeding back the encoded signal to control the encoding.

23. A method of embedding supplemental data in a signal, comprising the steps of:

unity bit encoding the signal in accordance with a given unity bit encoding process including feeding back the encoded signal to control the encoding; and modifying the signal to represent the supplemental data before feeding back the signal to control the encoding.

24. A method of embedding unity bit supplemental data in a signal, comprising the steps of:

encoding the signal in accordance with a given encoding process including feeding back the encoded signal to control the encoding; and combining unitary bit supplemental data into the signal before feeding the signal back to control the encoding.

25. A method of embedding supplemental data in a signal, comprising the steps of:

encoding the signal in accordance with a given encoding process;

combining supplemental data into the signal;

continuously feeding the combined and encoded signal containing the supplemental data back to the encoding process to control the encoding.

* * * * *